US008745385B2

(12) United States Patent
Goding et al.

(10) Patent No.: US 8,745,385 B2
(45) Date of Patent: Jun. 3, 2014

(54) SYSTEM AND METHOD FOR PROTECTING DATA WITH MULTIPLE INDEPENDENT LEVELS OF SECURITY

(75) Inventors: Jonathan D. Goding, Tampa, FL (US); Randall S. Brooks, Apollo Beach, FL (US)

(73) Assignee: Raytheon Company, Waltham, MA (US)

( * ) Notice: Subject to any disclaimer, the term of this patent is extended or adjusted under 35 U.S.C. 154(b) by 737 days.

(21) Appl. No.: 12/490,723

(22) Filed: Jun. 24, 2009

(65) Prior Publication Data
US 2010/0333193 A1 Dec. 30, 2010

(51) Int. Cl.
H04L 29/06 (2006.01)

(52) U.S. Cl.
USPC ............................. 713/166; 713/163; 713/164

(58) Field of Classification Search
USPC .......................................... 713/166, 163, 164
See application file for complete search history.

(56) References Cited

U.S. PATENT DOCUMENTS

| 6,775,781 | B1 | 8/2004 | Phillips et al. | |
|---|---|---|---|---|
| 6,981,140 | B1 * | 12/2005 | Choo | 713/164 |
| 7,178,015 | B2 * | 2/2007 | Shaw et al. | 713/1 |
| 7,409,487 | B1 | 8/2008 | Chen et al. | |
| 7,412,579 | B2 * | 8/2008 | O'Connor et al. | 711/163 |
| 7,412,702 | B1 | 8/2008 | Nelson et al. | |
| 7,523,489 | B2 * | 4/2009 | Bossemeyer et al. | 726/9 |
| 7,676,673 | B2 | 3/2010 | Weller et al. | |
| 7,693,838 | B2 | 4/2010 | Morgan et al. | |
| 7,734,916 | B2 | 6/2010 | LiVecchi | |
| 7,779,255 | B2 | 8/2010 | LiVecchi | |
| 7,840,763 | B2 * | 11/2010 | Murotake et al. | 711/153 |
| 7,895,642 | B1 * | 2/2011 | Larson et al. | 726/3 |
| 2002/0169987 | A1 | 11/2002 | Meushaw et al. | |
| 2003/0196108 | A1 | 10/2003 | Kung | |
| 2005/0257048 | A1 | 11/2005 | Willman | |

(Continued)

FOREIGN PATENT DOCUMENTS

| EP | 0 849 680 A2 | 6/1998 |
|---|---|---|
| EP | 0 849 680 A3 | 6/1998 |
| WO | WO 2010/0138537 A1 | 12/2010 |

OTHER PUBLICATIONS

Gerardo Pardo-Castellote et al., "An Introduction to DDS and Data-Centric Communications," RTI,, 2005 Real-Time Innovations, Last Revision Aug. 12, 2005, 15 pages.

(Continued)

Primary Examiner — Mohammad W Reza
(74) Attorney, Agent, or Firm — Daly, Crowley, Mofford & Durkee, LLP

(57) ABSTRACT

A data security system includes a single central processing unit (CPU), a plurality of different security zones corresponding to different levels of security classification, a plurality of operating systems, a communications interface, a global zone, and a memory coupled to the plurality of security zones and the global zone. The CPU includes a plurality of processing cores and each security zone is associated with a different one of the processing cores. The global zone is communicatively coupled to the communications interface and the plurality of security zones, and is associated with a different one of the processing cores than the plurality of security zones. The global zone directs communications between the communications interface and the plurality of security zones. Each processing core executes a separate one of the plurality of operating systems, thereby providing separate processing capability on the single CPU for each of the different levels of security classification.

19 Claims, 2 Drawing Sheets

(56) References Cited

U.S. PATENT DOCUMENTS

| | | |
|---|---|---|
| 2005/0268336 A1 | 12/2005 | Finnegan |
| 2006/0064566 A1* | 3/2006 | Gostin et al. ............ 711/203 |
| 2007/0112772 A1 | 5/2007 | Morgan et al. |
| 2007/0245030 A1 | 10/2007 | Das et al. |
| 2007/0294680 A1 | 12/2007 | Papakipos et al. |
| 2008/0016313 A1* | 1/2008 | Murotake et al. ............ 711/173 |
| 2008/0077993 A1* | 3/2008 | Zimmer et al. ............ 726/27 |
| 2008/0148341 A1 | 6/2008 | Ferguson et al. |
| 2009/0125902 A1 | 5/2009 | Ghosh et al. |
| 2009/0276618 A1 | 11/2009 | Madjlessi |
| 2009/0313446 A1 | 12/2009 | Schuba et al. |
| 2010/0132011 A1 | 5/2010 | Morris et al. |
| 2010/0293592 A1* | 11/2010 | Maximilien et al. ............ 726/1 |
| 2010/0306534 A1 | 12/2010 | Teijido et al. |

OTHER PUBLICATIONS

Office Action dated Jul. 20, 2012 for U.S. Appl. No. 12/787,108, filed May 25, 2010, 15 pages.
Response to Office Action filed Jan. 21, 2013, for U.S. Appl. No. 12/787,108, filed May 25, 2010, 37 pages.
Email to Examiner Shirazi dated Feb. 15, 2013 with claim amendments, for U.S. Appl. No. 12/787,108, filed May 25, 2010, 13 pages.
Notice of Allowance dated Mar. 4, 2013, for U.S. Appl. No. 12/787,108, filed May 25, 2010, 21 pages.
Letter enclosing Examination Report dated Oct. 10, 2012 for New Zealand Application No. 595860, filed Oct. 19, 2011, 4 pages.
PCT Search Report and Written Opinion of the ISA dated Aug. 25, 2010; for PCT Pat. App. No. PCT/US2010/036125; 10 pages.

* cited by examiner

SYSTEM AND METHOD FOR PROTECTING DATA WITH MULTIPLE INDEPENDENT LEVELS OF SECURITY

TECHNICAL FIELD

This disclosure relates in general to data security and more particularly to a system and method for protecting data with multiple independent levels of security.

BACKGROUND

Many government, public, and private entities have multiple classification levels for data. For example, an entity may have data at various physical locations with different classification levels, or an entity may have data associated with users who have different classification levels. As a result, many entities desire to secure their data by prohibiting the exchange and mixing of data with different classification levels.

In one example, a government entity may have top secret data and unclassified data. Consequently, the government entity may desire to keep the top secret data separated from the unclassified data in order to preserve the integrity and security of the top secret data.

SUMMARY OF THE DISCLOSURE

According to one embodiment, a data security system includes a single central processing unit (CPU), a plurality of different security zones corresponding to different levels of security classification, a plurality of operating systems, a communications interface, a global zone, and a memory coupled to the plurality of security zones and the global zone. The CPU includes a plurality of processing cores and each security zone is associated with a different one of the processing cores. The global zone is communicatively coupled to the communications interface and the plurality of security zones, and is associated with a different one of the processing cores than the plurality of security zones. The global zone is operable to direct communications between the communications interface and the plurality of security zones. Each processing core executes a separate one of the plurality of operating systems, thereby providing separate processing capability on the single CPU for each of the different levels of security classification.

Technical advantages of certain embodiments may include providing multiple independent levels of security with a CPU having multiple processing cores. This results in increased trustworthiness of the security of data and thus a reduction in user uncertainty. Other advantages may include providing a system and method for protecting data with multiple independent levels of security that is both provable and inexpensive to implement. Embodiments may eliminate certain inefficiencies such requiring separate systems for each classification level of data.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
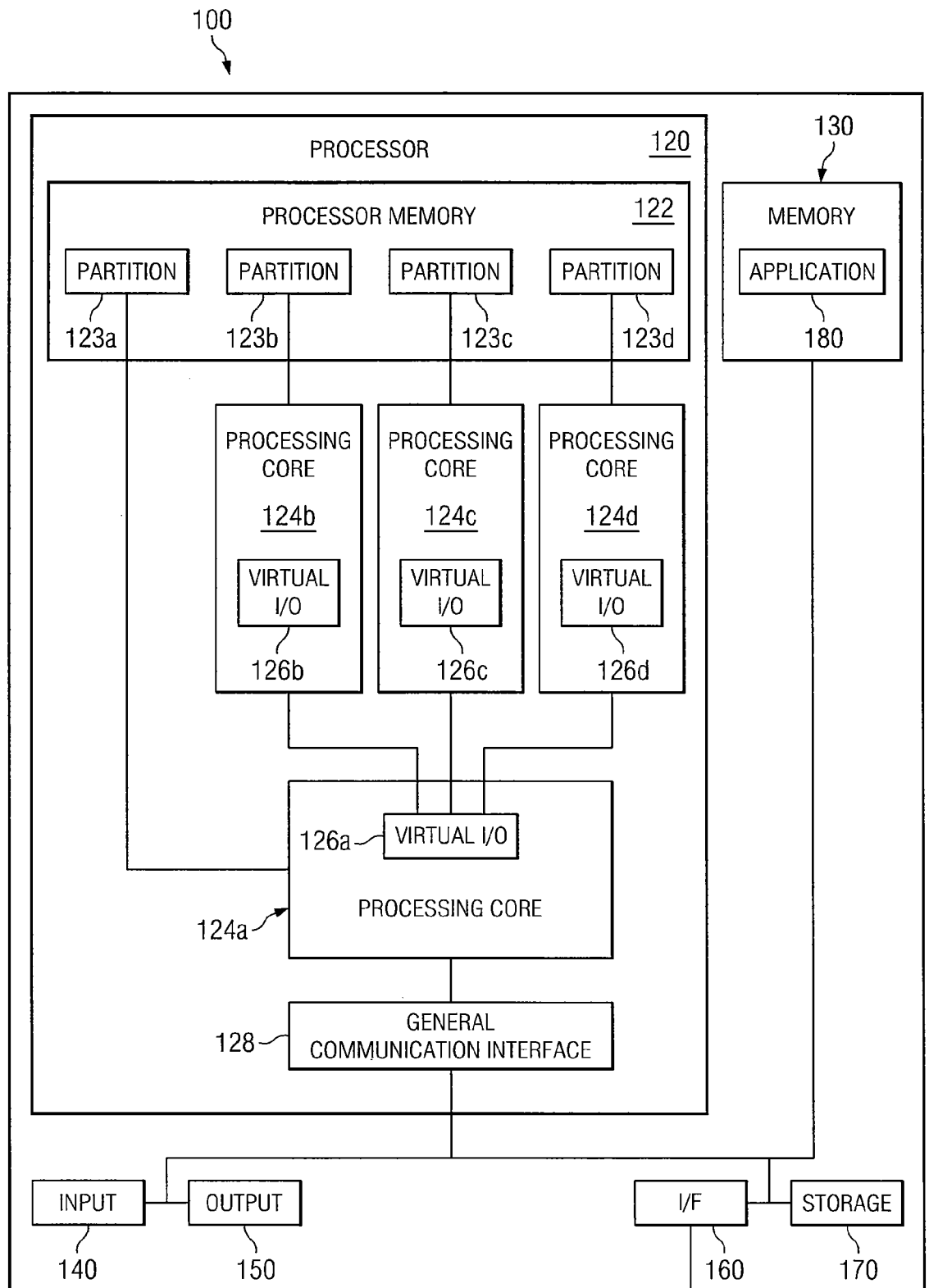
FIG. 1 is a simplified schematic diagram illustrating a system that may be utilized to protect data with multiple independent levels of security.
Figure 2:
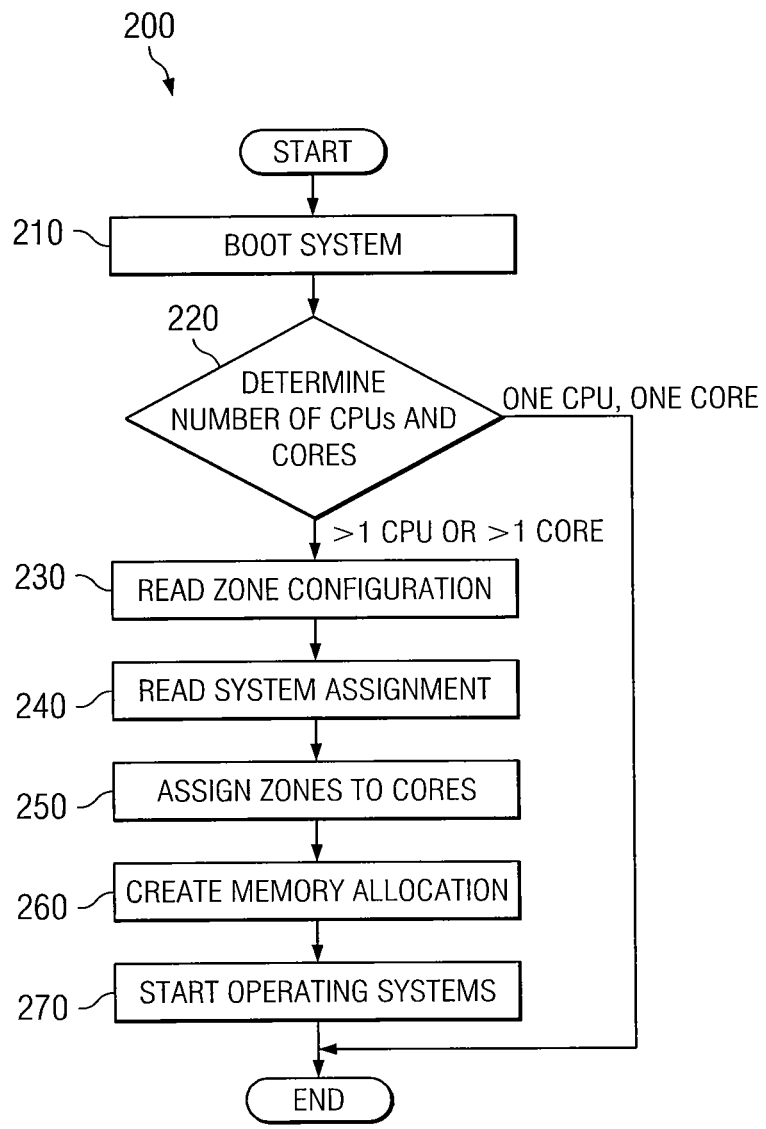
FIG. 2 is a flow chart illustrating a data security method that may be utilized by the system of FIG. 1 to protect data with multiple independent levels of security.

Embodiments of the present disclosure and its advantages are best understood by referring to FIGS. 1 and 2 of the drawings, like numerals being used for like and corresponding parts of the various drawings.

Many organizations such as government entities implement Multiple Independent Levels of Security (MILS) systems in order to control the cross-domain exchange of data having different security classification levels. Typical MILS systems employ separate systems of computers and networks that operate at different classification levels and are joined by high assurance devices such as guards and human-machine-interface switches. However, it may still be theoretically possible in existing MILS system for data to be accessed by unauthorized processes or users. In addition, typical MILS systems remain difficult to accredit and prove. The teachings of the disclosure recognize that it would be desirable for a system to be able to protect and separate data have different classification levels while being inexpensive and easy to implement. FIGS. 1 and 2 below illustrate embodiments of a system and method for protecting data with multiple independent levels of security by utilizing a multi-core processor.

FIG. 1 is block diagram illustrating a portion of a system 100 coupled to a network 190 according to one embodiment of the disclosure that may provide data integrity and security functions for data having different classifications. System 100 includes a multi-core processor 120, a memory device 130, an input device 140, an output device 150, a communications interface 160, a storage device 170 and an application 180. The components 120-170 of system 100 may be coupled to each other in any suitable manner. In the illustrated embodiment, the components 120-170 of system 100 are coupled to each other by a bus.

System 100 may operate as a computer in a MILS system. Multi-core processor 120 may receive/transmit data having different security classification levels to/from memory 130, storage 170, and/or network 190. Processor 120 processes any received data on various processing cores according to the data's security classification level, thereby providing separate processing capability on the single processor for each of the different levels of security classification. Multi-core processor 120 is described in more detail below.

Multi-core processor 120 further includes a processor memory 122, processor memory partitions 123(a)-123(d), processing cores 124(a)-124(d), virtual I/O interfaces 126(a)-126(d), and a general communications interface 128. Components 122-128 of multi-core processor 120 are integrated into a single component and are electrically coupled via typical die interconnections. Multi-core processor 120 generally refers to any suitable multi-core processing device capable of executing instructions and manipulating data to perform operations for system 100. For example, processor 100 may include any type of multi-core central processing unit (CPU). Functions that multi-core processor 120 may perform include data integrity and security functions for data having different classifications as described below in reference to FIG. 2.

In operation, multi-core processor 120 provides system 100 with MILS capabilities to process and secure data having multiple classifications levels. Unlike a typical MILS system that utilizes a single-core processor to process data using middleware and/or a separation kernel, multi-core processor 120 provides MILS capabilities in a single component. As a result, system 100 provides significant cost and performance advantages over existing MILS systems.

To provide MILS capabilities, processing cores 124 of processor 120 may be assigned to different security zones or classification levels. For example, processing core 124(*b*) may be assigned to a first classification level such as "top secret", and processing core 124(*c*) may be assigned to a second classification level such as "secret". Other classifications levels such as "unclassified" may also be utilized. In addition, certain processing cores 124 of processor 120 may be designated to be high-assurance guards (HAGs) in order to facilitate communications between different classification levels. For example, processing cores 124(*a*) and 124(*d*) may be designated as HAGs. Processing core 124(*a*) may be designated as a "global zone" and may function as a traffic director for the remaining processing cores 124, much like a separation kernel in typical MILS applications. Additionally, processing core 124(*d*) may be designated as a mediator in order to mediate between the classification levels of the other processing cores 124. In this example, processing core 124(*d*) would handle mediation between the top secret classification level of processing core 124(*b*) and the secret classification level of processing core 124(*c*).

General communications interface 128 may refer to any known communications interface for CPUs in the art. For example, general communications interface 128 may refer to a serial and/or parallel signal interface. General communications interface 128 generally receives and transmits data to/from processor 120.

Processor memory 122 may refer to any type of memory embedded in processor 120 and may be further segregated into processor memory partitions 123(*a*)-123(*d*). Each processor memory partition 123 may correspond to an individual processing core 124. In such an embodiment, each processing core 124 is permitted to read from and write only to its corresponding processor memory partition 123. This ensures that data from one classification level such as "top secret" is not intermingled with data from a different classification level such as "unclassified." As a result, data security and integrity is increased.

In order to process data and control the cross-domain exchange of data, an operating system such as Solaris with Trusted Extensions may be executed on each core 124. In addition, a Transmission Control Protocol (TCP) Internet Protocol (IP) and a crypto engine may be executed on each core. The communications between the different cores 124 may be encrypted, employing security such as Security Assertion Markup Language (SAML) labels (or any other XML-based security labels), Commercial Internet Protocol Security Option (CIPSO), and adjudicated by guards. Communications between the different cores 124 may be handled by virtual I/O interfaces 126, which may refer to any known elements in the art that are capable of transmitting and receiving signals for processing cores 124.

Memory device 130 may refer to any suitable device capable of storing and facilitating retrieval of data. For example, memory device 130 may include logic in the form of software applications, computer memory (e.g., Random Access Memory (RAM) or Read Only Memory (ROM)), a magnetic disk, a disk drive, a compact disk (CD) drive, a digital video disk (DVD) drive, removable media storage, or any other suitable data storage medium, including combinations thereof. In this example, application 180 embodied as logic within memory device 130 generally provides improvements to typical data security processes such as the embodiment described below in reference to FIG. 2. However, application 180 may alternatively reside within any of a variety of other suitable computer-readable medium, including, for example, storage device 170, removable storage media (e.g., a Compact Disk (CD), a Digital Video Disk (DVD), or flash memory), any combination of the preceding, or some other computer-readable medium.

Input device 140 may refer to any suitable device capable of inputting, selecting, and/or manipulating various data and information. For example, input device 140 may include a keyboard, mouse, graphics tablet, joystick, light pen, microphone, scanner, or other suitable input device. Output device 150 may refer to any suitable device capable of displaying information to a user. For example, output device 150 may include a video/graphical display, a printer, a plotter, or any other suitable output device.

Communication interface 160 may refer to any suitable device capable of receiving input for system 100, sending output from system 100, performing suitable processing of the input or output or both, communicating to other devices, or any combination of the preceding. For example, communication interface 160 may include appropriate hardware (e.g., modem, network interface card, etc.) and software, including protocol conversion and data processing capabilities, to communicate through a LAN, WAN, or other communication system that allows system 100 to communicate to other devices. Communication interface 160 may include one or more ports, conversion software, or both. In the illustrated embodiment, communication interface 160 is coupled to network 190 discussed below.

Storage device 170 may refer to any suitable device capable of storing computer-readable data and instructions. Storage device 170 may include, for example, mass storage media (e.g., a magnetic drive, a disk drive, or optical disk), removable storage media (e.g., a Compact Disk (CD), a Digital Video Disk (DVD), or flash memory), a database and/or network storage (e.g., a server), other computer-readable medium, or a combination and/or multiples of any of the preceding.

The components of system 100 may be integrated or separated. In some embodiments, components 120-170 may each be housed within a single chassis. The operations of system 100 may be performed by more, fewer, or other components. Additionally, operations of system 100 may be performed using any suitable logic that may comprise software, hardware, other logic, or any suitable combination of the preceding.

In general, network 190 may include at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

A data security method such as method 200 described below in reference to FIG. 2 may be utilized by global zone core 124(*a*) to initialize and maintain a security system such as system 100 in FIG. 1.

FIG. 2 illustrates a data security method 200 that may be used by multi-core processor 120 to provide data integrity and security functions for data having different classification levels. Software implementing security method 200 may be stored, for example, in memory device 130 and may correspond to application 180 as shown above in FIG. 1.

Data security method 200 begins in step 210 where the system in which multi-core processor 120 resides is booted. In step 220, data security method 200 determines the number of CPUs in the system and the number of cores of each CPU. If it is determined in step 220 that there is only one single-core CPU, data security method 200 returns a fail code and ends. If, however, it is determined in step 220 that there is either more than one CPU or there is one CPU that has more than one processing core, data security method 200 proceeds to step 230.

In step 230, data security method 200 reads a zone configuration file. The zone configuration may be any digital file that instructs data security method 200 on the number and types of classification levels needed in the system. For example, the zone configuration file may instruct data security method 200 that a top secret zone and a secret classification zone are needed.

In step 240, data security method 200 may read a system assignment. The system assignment may by a digital file that instructs data security method 200 on how to allocate the cores of the system CPUs. For example, the system assignment may instruct data security method 200 to allocate one core of a CPU to the top secret classification zone, and one core to the secret classification zone.

The zone configuration and the system assignment may be digital files that are located, for example, anywhere that is accessible to multi-core processor 120 including, but not limited to, memory 122, memory 130, and storage 170.

In step 250, data security method 200 assigns zones to processing cores 124 according to the zone configuration file and the system assignment. In one embodiment, data security method 200 may designate a first processing core 124 as the global zone to function as a traffic director for the remaining processing cores 124. Data security method 200 may then assign the remaining processing cores 124 according to the zone configuration file and the system assignment as read in steps 230 and 240.

In step 260, data security method 200 creates a memory allocation. In one embodiment, data security method 200 may allocate memory according to equation (1) below:

$$\text{memory}_{zone} = \frac{(\text{memory}_{system} - \text{memory}_{globalzone})}{\# \text{ of zones}} \quad (1)$$

where $\text{memory}_{zone}$ is the amount of memory allocated for each zone, $\text{memory}_{system}$ is the total amount of memory in the system, and $\text{memory}_{globalzone}$ is the amount of memory allocated for the global zone.

In step 270, data security method 200 initializes the operating systems for each zone. For example, if there is one top secret zone running on one processing core 124 and one secret zone running on another processing core 124, a separate operation system will be initialized and executed on each processing core 124.

Although the embodiments in the disclosure have been described in detail, numerous changes, substitutions, variations, alterations, and modifications may be ascertained by those skilled in the art. For example, FIG. 1 depicts a system 100 having four processing cores 124 that may be used to provide data integrity and security functions for data having different classifications. System 100, however, may include any number of processing cores 124 and is not limited to four. It is intended that the present disclosure encompass all such changes, substitutions, variations, alterations and modifications as falling within the spirit and scope of the appended claims.

What is claimed is:

1. A data security system comprising:
    a single central processing unit (CPU), the CPU further comprising a plurality of processing cores;
    a plurality of different security zones corresponding to different levels of security classification, each security zone associated with a different one of the processing cores;
    a plurality of operating systems;
    a communications interface operable to transmit and receive data for the CPU;
    a global zone communicatively coupled to the communications interface and the plurality of security zones, the global zone operable to direct communications between the communications interface and the plurality of security zones; and
    a memory coupled to the plurality of security zones and the global zone;
    wherein each processing core executes a separate one of the plurality of operating systems, thereby providing separate processing capability on the single CPU for each of the different levels of security classification.

2. The data security system of claim 1 wherein the plurality of operating systems comprises Sun Microsystem's Solaris operating system with Trusted Extensions.

3. The data security system of claim 1 further comprising a High Assurance Guard (HAG) associated with a different one of the plurality of processing cores than the plurality of security zones and the global zone, the HAG operable to facilitate communications between the plurality of security zones.

4. The data security system of claim 1 wherein the memory is allocated into a plurality of partitions corresponding to the global zone and the plurality of security zones.

5. The data security system of claim 4 wherein each security zone is communicatively coupled to one of the plurality of partitions of the memory that is not accessible to the remainder of the plurality of security zones.

6. The data security system of claim 1 wherein the plurality of security zones, the global zone, and the communications interface are operable to communicate using Security Assertion Markup Language (SAML) labels.

7. The data security system of claim 1 wherein the plurality of security zones, the global zone, and the communications interface are operable to communicate using Commercial Internet Protocol Security Option (CIPSO).

8. A data security method comprising:
    determining the number of central processing units (CPUs) available;
    determining the number of processing cores of each CPU;
    receiving a zone configuration indicating one or more security zones to be implemented, each security zone corresponding to a classification of data;
    assigning each of the one or more security zones to one of the processing cores;
    assigning one of the processing cores to a global zone, the global zone operable to direct communications between a communications interface and the one or more security zones;
    allocating a memory into a plurality of partitions corresponding to the global zone and the one or more security zones; and
    initializing an operating system for each of the assigned security zones.

9. The data security method of claim 8 wherein the initializing an operating system for each of the assigned security zones comprises initializing Sun Microsystem's Solaris operating system with Trusted Extensions.

10. The data security method of claim 8 further comprising assigning a High Assurance Guard (HAG) to a different one of the processing cores than the one or more security zones and the global zone, the HAG operable to facilitate communications between the one or more security zones.

11. The data security method of claim 8 wherein each security zone is communicatively coupled to one of the plurality of partitions of the memory that is not accessible to the remainder of the security zones.

12. The data security method of claim 8 wherein the one or more security zones, the global zone, and the communications interface are operable to communicate using Security Assertion Markup Language (SAML) labels.

13. The data security method of claim 8 wherein the one or more security zones, the global zone, and the communications interface are operable to communicate using Commercial Internet Protocol Security Option (CIPSO).

14. Non-transitory computer-readable media having logic stored therein, the logic operable, when executed on a processor, to:
   determine the number of central processing units (CPUs) available;
   determine the number of processing cores of each CPU;
   receive a zone configuration indicating one or more security zones to be implemented, each security zone corresponding to a classification of data;
   assign each of the one or more security zones to one of the processing cores;
   assign one of the processing cores to a global zone, the global zone operable to direct communications between a communications interface and the one or more security zones;
   allocate a memory into a plurality of partitions corresponding to the global zone and the one or more security zones; and
   initialize an operating system for each of the assigned security zones.

15. The media of claim 14 wherein the the logic operable to initialize an operating system for each of the assigned security zones comprises logic operable to initialize Sun Microsystem's Solaris operating system with Trusted Extensions.

16. The media of claim 14 further comprising logic operable to assign a High Assurance Guard (HAG) to a different one of the processing cores than the one or more security zones and the global zone, the HAG operable to facilitate communications between the one or more security zones.

17. The media of claim 14 wherein each security zone is communicatively coupled to one of the plurality of partitions of the memory that is not accessible to the remainder of the security zones.

18. The media of claim 14 wherein the one or more security zones, the global zone, and the communications interface are operable to communicate using Security Assertion Markup Language (SAML) labels.

19. The media of claim 14 wherein the one or more security zones, the global zone, and the communications interface are operable to communicate using Commercial Internet Protocol Security Option (CIPSO).

* * * * *